United States Patent [19]
Sherman

[11] Patent Number: 5,445,063
[45] Date of Patent: Aug. 29, 1995

[54] ROTISSERIE MECHANISM

[76] Inventor: Stephen E. Sherman, P.O. Box 382, Bethel Island, Calif. 94511

[21] Appl. No.: 266,207

[22] Filed: Jun. 27, 1994

[51] Int. Cl.6 .......................... A47J 37/04; A47J 37/07
[52] U.S. Cl. .................................... 99/421 H; 99/419; 99/427; 211/181
[58] Field of Search ............. 99/419, 421 H, 421 HH, 99/421 HV, 421 R, 426, 427, 449, 450; 211/125, 181; 126/25 R, 41 B

[56] References Cited

U.S. PATENT DOCUMENTS

| | | | |
|---|---|---|---|
| 549,875 | 11/1895 | Lepper | 211/181 X |
| 1,031,595 | 7/1912 | Taber | 211/181 X |
| 1,359,749 | 11/1920 | Schey | . |
| 1,888,616 | 11/1932 | Bocchino | 99/421 HV |
| 1,971,523 | 8/1934 | Feingold | 211/181 X |
| 2,320,304 | 5/1943 | Rosset | 53/5 |
| 2,760,428 | 8/1956 | Boyajian | 99/427 |
| 2,846,941 | 8/1958 | Goodwin | 99/427 |
| 3,040,650 | 6/1962 | Watts | 99/402 |
| 3,049,072 | 8/1962 | Smith | 99/427 |
| 3,084,618 | 4/1963 | Dieterich | 99/427 |
| 3,285,160 | 11/1966 | Smith | 99/427 |
| 3,359,889 | 12/1967 | Young et al. | 99/426 |
| 3,527,155 | 9/1970 | Renn | 99/421 H |
| 3,922,961 | 12/1975 | Case | 99/427 |
| 4,005,646 | 2/1977 | Kruper | 99/427 |
| 4,037,737 | 7/1977 | Stevens et al. | 211/181 |
| 4,200,040 | 4/1980 | MacRae | 99/426 |
| 4,442,762 | 4/1984 | Beller | 99/427 |
| 4,583,452 | 4/1986 | Grosse | 99/427 |
| 5,325,767 | 7/1994 | Beller | 99/421 R |

FOREIGN PATENT DOCUMENTS 921957  3/1963  United Kingdom ................. 99/427

Primary Examiner—Timothy F. Simone
Attorney, Agent, or Firm—Bielen, Peterson & Lampe

[57] ABSTRACT

A rotisserie mechanism utilizing a base member having a first portion and second portions which are angularly disposed relative to one another. The first and second portions may take the form of a pair of racks and are held to a rotisserie rod. A holding element is locked to the base member and includes a locking device for fastening the holding element thereto. Thus, food items to be cooked on a rotisserie are clipped to the rotisserie rod by the base member and holding element. The rod is easily disengaged from the turning motor and includes block supports and a stop that prevents the rod from accidentally moving downwardly into the source of heat.

9 Claims, 4 Drawing Sheets

ROTISSERIE MECHANISM

BACKGROUND OF THE INVENTION

The present invention relates to a novel and useful rotisserie mechanism useful in barbecuing foods.

Meats and other foodstuffs are often roasted or barbecued over an open fire. Many systems and mechanisms and have been devised to hold the foods in place while such foodstuffs are cooked. For example, a simple grill has been employed in conjunction with a pit to hold hot coals. In addition, racks have been employed to rotate such foodstuffs either manually or with a motor.

U.S. Pat. Nos. 2,320,304, 3,359,889, 4,442,762, and 4,200,040 show meat holding devices which clamp the foodstuff in an oven over a barbecue for cooking.

U.S. Pat. 1,359,749, 3,049,072, 3,084,618, 3,922,961, 4,005,646, and 4,583,452 show spit clamps and racks which permit foodstuffs to be rotated over a fire for the purpose of cooking.

All known prior art rotisserie mechanism suffer from the disability in that multiple foodstuffs are difficult to cook and require elaborate procedures for engaging and disengaging the foodstuffs before, during, and after cooking. In addition, such mechanisms do not permit the partial disengagement of single foodstuff being cooked while allowing remaining foodstuffs to be cooked-during such interruption.

A rotisserie mechanism which is simple and easy to use and is versatile in application for multiple foodstuffs being cooked on a barbecue would be a notable advance in the food handling industry.

SUMMARY OF THE INVENTION

In accordance with the present invention, a novel and useful rotisserie mechanism is herein provided.

The mechanism of the present invention uses a rod or spit that is rotatable by a motor over a source of heat. The motor may be conventionally linked to the spit by a chain and sprocket. The mechanism includes a base member connected to the rod and includes a first portion and a second portion that is angularly disposed relative to the first portion. The first and second portions form a roughly V-shaped rack which extends from the rod or spit. In certain instances, the base member may take the embodiment of an elongated member forming a first plurality of loops constituting the first portion of the base member and a second plurality of loops constituting the second portion of the base member. Thus, the meat or foodstuff is placed on the base member and spread over the source of heat which may be a barbecue fire.

A holding element is also utilized in the present invention and is movable toward or away from the base member. The holding element may take the form of a finger or rod that is pivotally attached to the base member or the rod itself. Holding element presses downwardly on the base member to hold the foodstuff in place. Locking means is also provided for fastening the holding element to the base member and may take the form of a simple loop formed in the base member to engage the rotating holding element. The base member may be directly formed with the rod or secured thereto by securing means to the rod. Such securing means may take the form of welding, bolting, screwing and like mechanisms which are compatible with rotisserie environments.

The base member may also be formed with a platform which extends transversely relative to the rod. The platform may be connected to the holding element such that a particular foodstuff, such as a whole chicken, rack of ribs, and the like, would be pressed against the base member as desired. In addition, the platform may include a pair of notches to encompass the legs or wing of a poultry item being barbecued. Moreover, a flange may also be included in the present invention and may be connected to the rotating holding element to pinion or hold anatomical parts of items being barbecued, such as chicken wings. In addition, other structures may be formed from the base member to particularly conform to the characteristic form of the item being cooked.

Further, the mechanism of the present invention may be multiple in number such that a plurality of base members each having a holding element along a single or on multiple rods spanning across a barbecue pit. In this regard, a single mechanism may rotate each of the rods and includes disengagement means to interrupt the linkage of the rod used with the rotisserie mechanism to a conventional turning motor. Such disengagement means may include a pair of blocks that are supported adjacent the rod and preferably to the pit providing the source of heat for the barbecue. Such blocks are formed with an open notch to permit the rod to be lifted from the blocks or to be slid therealong. A pair of stops are fixed to the rod to prevent movement of the rod along the pair of blocks at selected times. The pair of stops are located along the rod such that only one stop contacts a block while the other stop is free from contact of the other block. By lifting and sliding, one may disengage the rod and prevent the same from falling into the pit by the use of one of the stops. The other stop would insure that the rod is engaged with the turning motor during rotation.

It may be apparent that a novel and useful rotisserie mechanism has been described.

It is therefore an object of the present invention to provide a rotisserie mechanism which is useable in a barbecue pit and is easily connectable to a rotating motor to cook multiple foodstuffs over the barbecue pit.

Another object of the present invention is to provide a rotisserie mechanism which quickly and easily holds a foodstuff and releases the same when cooking has occurred.

A further object of the present invention is to provide a rotisserie mechanism which includes movable parts that are not removable from the mechanism.

Yet another object of the present invention is to provide a rotisserie mechanism which is useable with a rod or spit on a barbecue and may cook multiple foodstuffs on the same rod or multiple foodstuffs using multiple rods.

Yet another object of the present invention is to provide a rotisserie mechanism which securely holds a whole poultry item to a spit or rod used in a barbecue without slippage and accidental removal of the same from the rod.

A further object of the present invention is to provide a rotisserie mechanism for a open pit barbecue which permits the use of multiple spits or rods that may individually deactivated while permitting other spits or rods to continue rotating and, thus, cooking the foodstuffs contained thereupon.

The invention possesses other objects and advantages, especially as concerns particular characteristics and features thereof which will become apparent as the specification continues.

Figure 1:
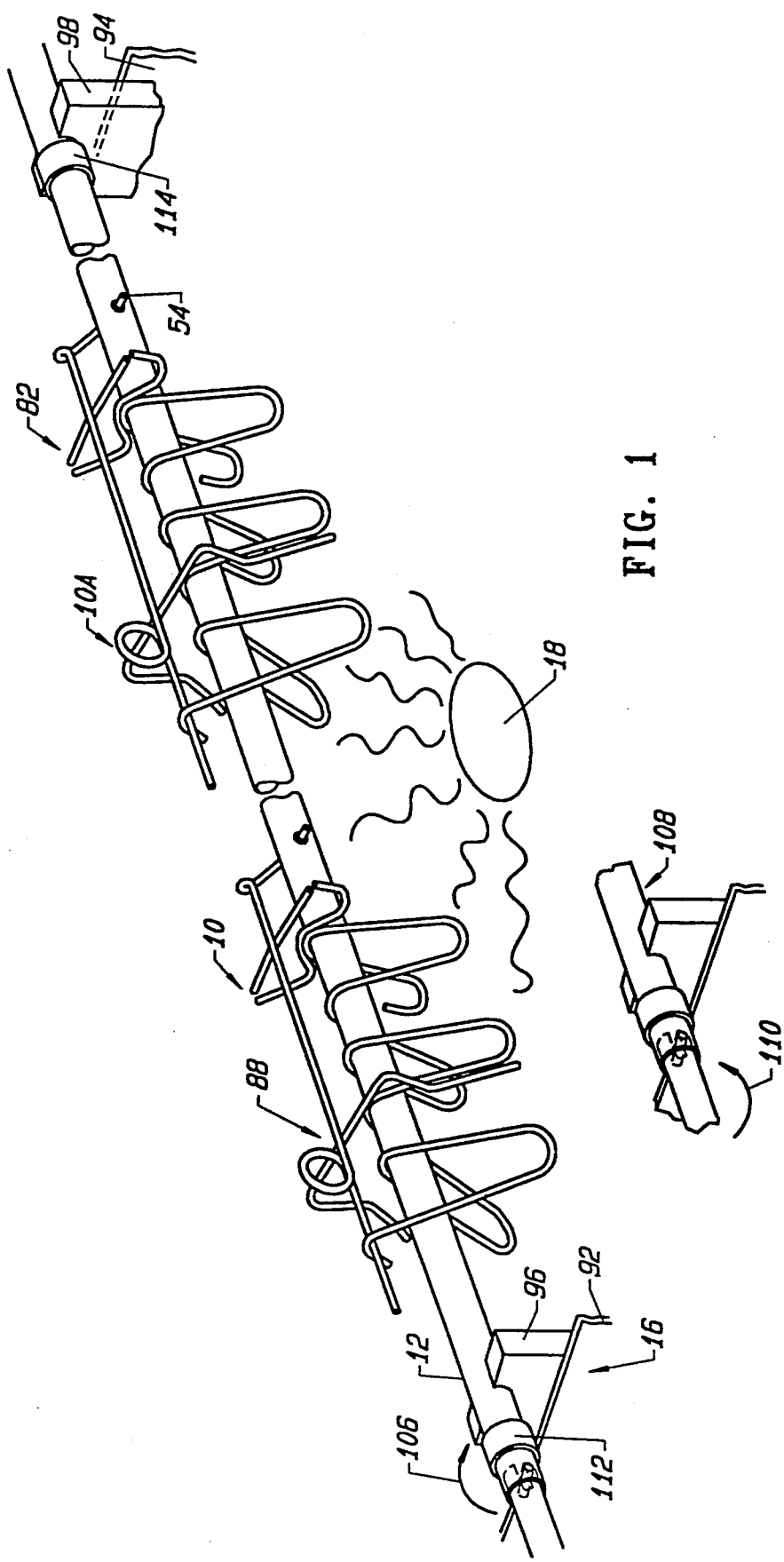
FIG. 1 is a top right isometric view of the rotisserie mechanism of the present-invention utilizing multiple base members and holding elements as well as multiple spits or rods.

For a better understanding of the invention, reference is made to the following Detailed Description of the Preferred Embodiments which should be taken in conjunction with to the prior described drawings.

DETAILED DESCRIPTION OF THE PREFERRED EMBODIMENTS

Various aspects of the present invention will evolve from the following Detailed Description of the Preferred Embodiments thereof which should be referenced to the prior described drawings.

The invention as a whole is shown in the drawings by reference character 10. The rotisserie mechanism 10 employs a hollow rod 12 that is rotatable by a motor of conventional configuration (not shown) which rotates a sprocket 14, best seen on FIGS. 5 and 6. Hollow rod 12 is intended to lie over a source of heat 18 found in a barbecue 16 shown partially in FIG. 1. Barbecue 16 providing such source of heat 18 is shown schematically in FIG. 1. Source of heat 18 may be hot charcoals, an electrical heating element, a gas flame, and the like.

Figure 2:
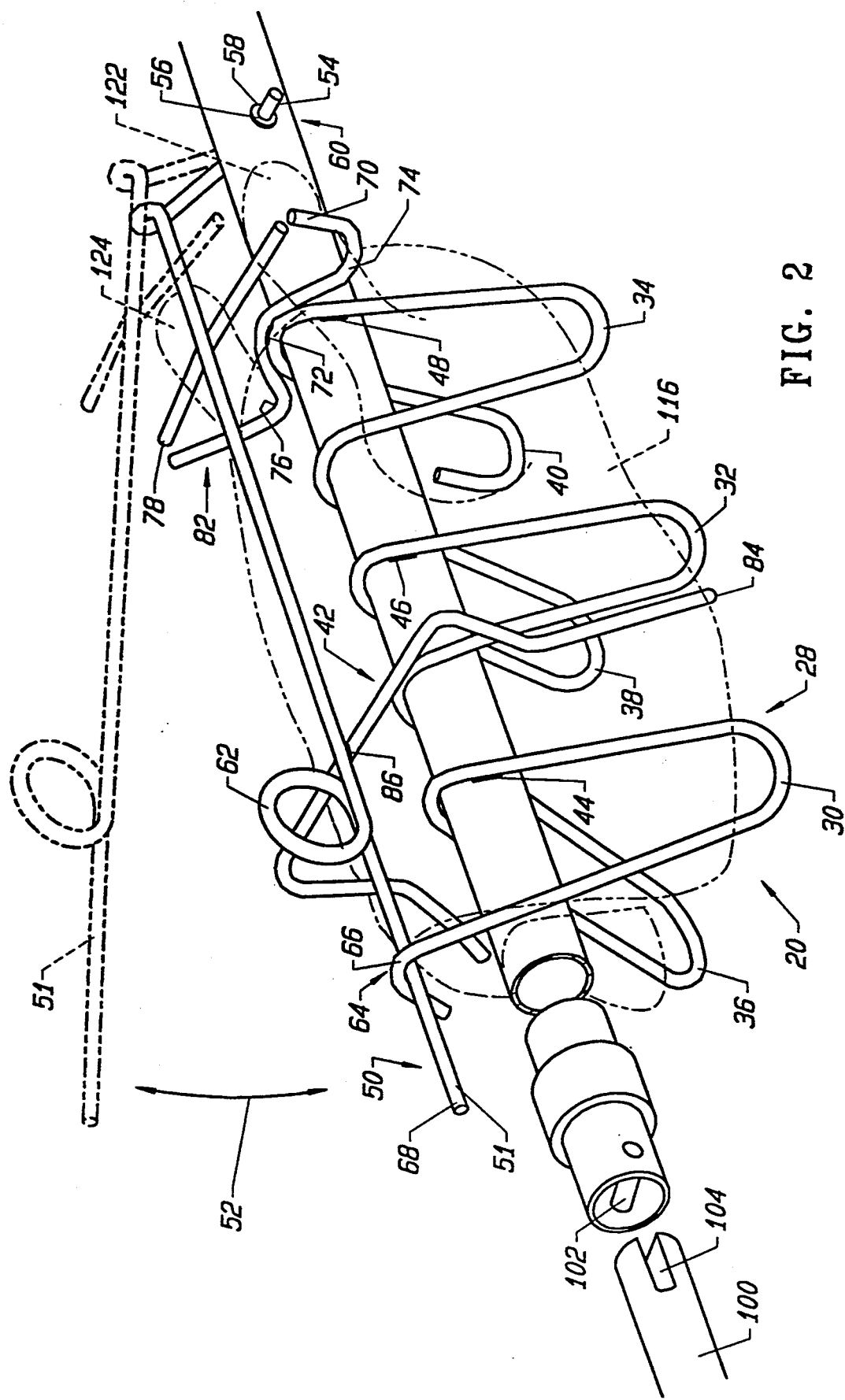
FIG. 2 is a top right isometric view of a portion of the rotisserie mechanism of the present invention illustrating the holding and removal of a poultry foodstuff therefrom.
Figure 3:
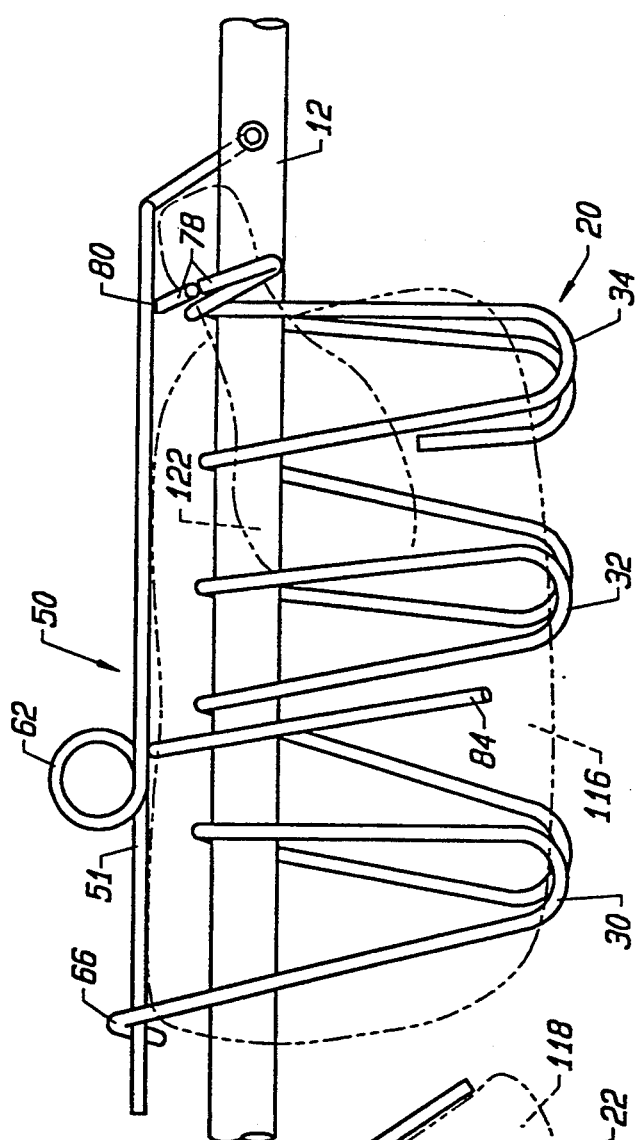
FIG. 3 is a side elevational view of the rotisserie mechanism of the present invention.
Figure 4:
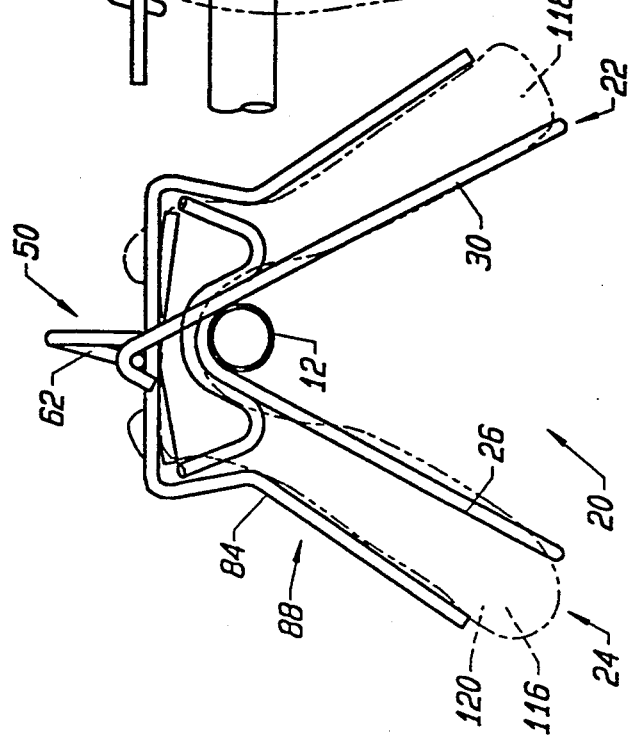
FIG. 4 is an end elevational view of the rotisserie mechanism of the present invention.

Rotisserie mechanism 10 includes as one of its elements a base member 20, clearly shown in FIGS. 2, 3, and 4. Base member 20 possesses a first portion 22 and a second portion 24 which extend from hollow rod 12 and are angularly disposed relative to one another. As depicted in the drawings, base member 20 is formed from an elongated member 26 that has been bent over hollow rod 12 to form a plurality of loops 28. Loops 30, 32, and 34 are aligned with one another are essentially co-planar. Loops 36, 38, and 40 are also aligned with one anther and essentially co-planar. With respect to FIG. 4, it may be observed that loops 30, 32, and 34 constitute first portion 22 while loops 36, 38, and 40 constitute second portion 24 of base member 20. First portion 22 and second portion 24 form a roughly V-shaped configuration when viewed from the end of mechanism 10 on FIG. 4. Securing means 42 supports base member 20 to hollow rod 12. Securing means 42 may take the form of welds points 44, 46 and 48, FIG. 2. Of course, other methods may be employed to support base member 20 such that securing means 42 may take the form of glue, mechanical fasteners, unitary construction with hollow rod 12, and the like.

Holding element 50 is also illustrated in the drawings. Holding element 50 includes a finger 51 which is movable toward and away from base member 12 according to directional arrow 52, FIG. 2. Holding member 50 is illustrated in its open position in phantom on FIG. 2. End portion 54 of holding element 52 extends through hollow rod 12 and bore 56 and is held in place by a ring 58 fixed end portion 54. Thus, a pivot 60 is formed thereby. It should be noted that pivot 60 may be alternatively formed on base member 20. Holding element 50 also includes a short helix 62 which permits the user of mechanism 10 to maneuver holding element 50.

Locking means 64 is also shown in the drawings and is structured as an open loop 66 found at the bitter end 68 of elongated member 26. As is illustrated by the drawings, bitter end 68 of elongated member 26 is capable of slipping beneath open loop 66.

With further reference to FIGS. 1–4, mechanism 10 may be additionally provided with a platform 70 which extends from base member 20 and is held thereto by weld point 72, FIG. 2. Platform possesses notches 74 and 76, the function of which will be described hereinafter. Bar 78 fixes to holding element 50 at weld point 80. When holding element 50 is the position depicted in FIG. 2, bar 78 and platform 70 form a clamp 82. In addition, a flange 84 is illustrated most lucidly on FIGS. 1–4. Flange 84 fixes to holding elements 50 at weld point 80. Flange 86 and base member 20 also serve as a clamp 88.

Figure 5:
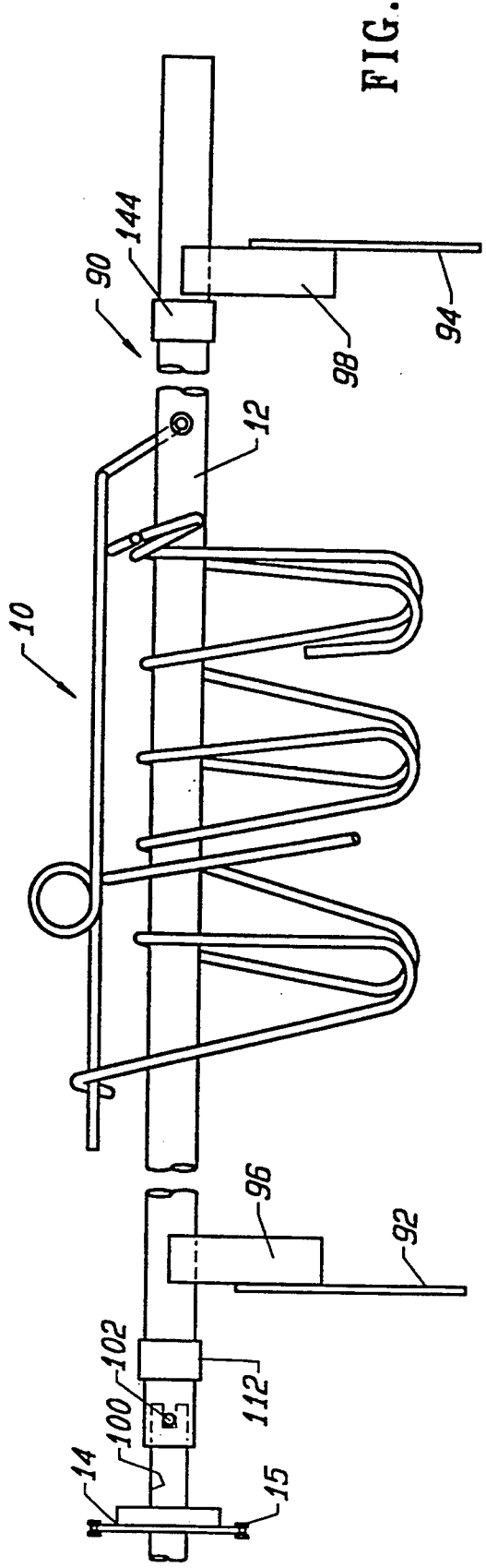
FIG. 5 is a side elevational view of the rotisserie mechanism of the present invention illustrating the engagement mechanism with a rotating motor.
Figure 6:
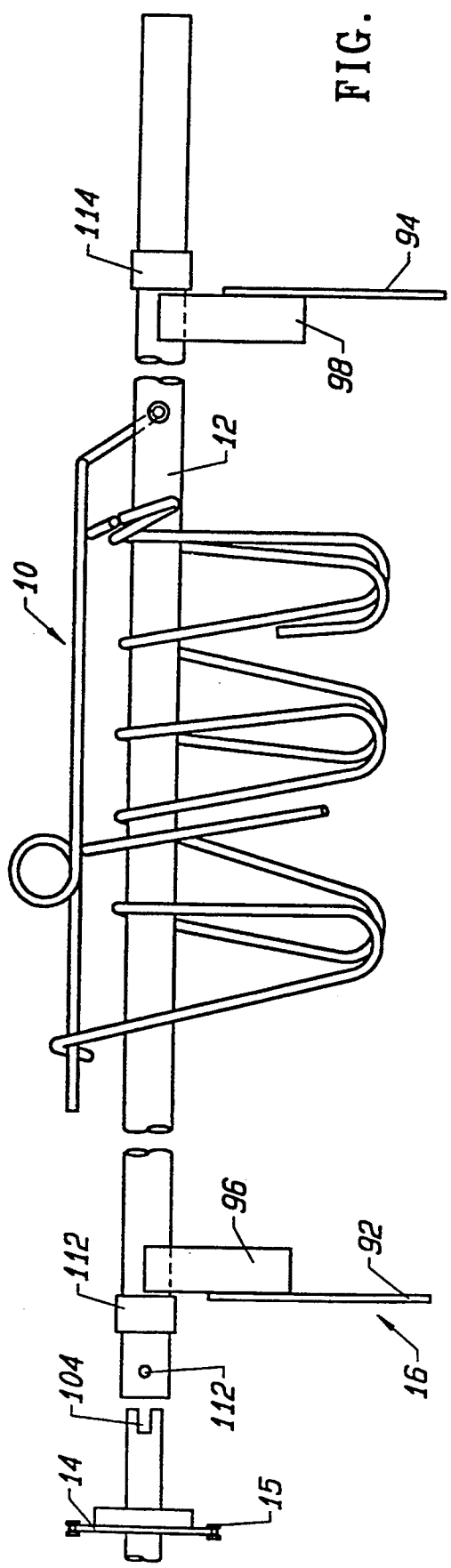
FIG. 6 is a side elevational view of the rotisserie mechanism of the present invention illustrating the disengagement of the rod or spit from a rotating motor.

Turning to FIGS. 1, 5, and 6, it may observed that rotisserie mechanism 10 also possesses disengagement means 90 for removing mechanism 10 from barbecue 16. Walls 92 and 94 of barbecue 16 support yokes or blocks 96 and 98 respectively. Hollow rod 12 lies in yokes 96 and 98 which are supported to walls 92 and 94 of barbecue 16 or lies at the bottom portion thereof (not shown). Hollow rod 12 is free to turn within yokes 96 and 98 by the turning of the sprocket 14 connected by claim 15 to a motor (not shown). Sprocket 14 terminates in a slotted member 100 which engages a pin 102 which is fixed within hollow rod 12. With reference to FIGS. 1 and 5, it may be apparent that pin 102 of hollow rod 12 has engaged slot 104 of slotted member 100. Thus, hollow rod 12 is turning according to directional 106 above heat source 18. It should be recognized that another rod 108 may also be turned by motor (not shown) through a conventional chain and sprocket. In many instances, rod 108 may be turned in the opposite direction according to directional arrow 110. Rod 108 may be supported in the same manner as rod 12 described in FIGS. 1, 5 and 6. Disengagement means 90 may further include the provision of stops or collars 112 and 114 which are firmly fixed to the exterior surface of hollow rod 12. Collar 114 is capable of engaging block 98 and thus, prevents the disengagement of hollow rod 12, specifically the disengagement of pin 102 from slot 104, FIG. 5. FIG. 6 represents this particular disengagement of pin 102 from slot 104 and where hollow rod 12 has been lifted to clear collar 114 from yoke 98. At this point, collar 112 is capable of engaging yoke 96. Yoke 98 support hollow rod 12 apart from collar 114 at this point. The impingement of collar 112 on yoke 96 would prevent hollow rod 12 from falling into barbecue pit 16 and against source of heat 18.

In operation, the user would place a foodstuff such a whole chicken 116 on base member 20 of mechanism 10 such that the leg portion of the chicken lie in notches 74 and 76 of platform 70. The first and second portions 22 and 24 of base member 20 will tend to split the whole chicken 116 such that the breast portions 118 and 120 lie against first and second portions 22 and 24, respectively. Holding element 50 in the form of fingers 51 is then rotated downwardly as depicted in FIG. 2 such that bitter end 68 of elongated member 26 engages open loop 66. Whole chicken 116 is now pinioned into place on mechanism 10. Bar 78 and platform 70 form a clamp for the leg portions 122 and 124 of whole chicken 116. Notches 74 and 76 of platform 70 are particularly suited for this function. Also, flange 84 tends to tuck into and secure whole chicken 116 near the wing portions thereof. Hollow rod 12 may be fitted with any number of mechanisms, such as mechanism 10. Mechanism 10 and 10a are depicted in FIG. 1 as lying along hollow rod 12. Hollow rod 12 is then pushed to engagement with slotted member 100 connected to sprocket 14 and chain 15 connected to the motor (not shown). Pin 102 specifically falls into slot 104 at this juncture. Collar 114 on hollow rod 12 prevents the movement of hollow rod 12 away from sprocket 14 and chain 15. Hollow rod 12 and mechanisms 10 and 10a are then rotated to cook chicken 116 over barbecue 16 having source of heat 18. When cooking is completed, hollow rod 12 is lifted such that collar 114 passes over yoke 98 and collar 112 engages yoke 96. At this point, hollow rod 12 no longer turns. Individual mechanisms 10 and 10a may then be opened by engagement of helix 62 with a tool and the removal of fingers 51 from loop 61. Chicken 116 may then be taken from mechanism 10. It should be noted that parallel rod 108 containing similar mechanisms to mechanism 10 and 10a would continue to turn while the user is adjusting the foodstuffs on hollow rod 12 during disengagement. Hollow rod 12 may be reengaged and to again cook any foodstuffs placed in mechanisms 10 and 10a.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A rotisserie mechanism utilizing a rod rotatable over a source of heat comprising:
   a. a base member connected to the rod including a first portion and a second portion, said first portion angularly disposed relative to said second portion;
   b. holding element movable toward said base member;
   c. locking means for fastening said holding element to said base member, said locking means including a loop formed by said base member, said loop being engagable by said holding element; and
   d. securing means for supporting said base member to the rod.

2. The rotisserie of claim 1 which additionally comprises a pivot, said holding element being linked to said pivot for movement toward said base member.

3. A rotisserie mechanism utilizing a rod rotatable over a source of heat comprising:
   a. a base member connected to the rod including a first portion and a second portion, said first portion angularly disposed relative to said second portion;
   b. holding element movable toward said base member;
   c. locking means for fastening said holding element to said base member;
   d. securing means for supporting said base member to the rod; and
   e. a platform extending from said base member, said platform including a pair of notches, and a bar affixed to said holding element, said bar and base member forming a clamp.

4. The rotisserie of claim 3 which further comprises a flange extending from said holding element said flange being spaced along said holding element from said bar.

5. A rotisserie mechanism utilizing a rod rotatable over a source of heat comprising:
   a. a base member connected to the rod including a first portion and a second portion, said first portion angularly disposed relative to said second portion, said base member including an elongated member connected to the rod and forming a first plurality of loops and a second plurality of loops being aligned and said first plurality of loops being angularly disposed relative to said second plurality of loops;
   b. holding element movable toward said base member;
   c. locking means for fastening said holding element to said base member; and
   d. securing means for supporting said base member to the rod.

6. A rotisserie mechanism utilizing a rod rotatable over a source of heat comprising:
   a. a base member connected to the rod including a first portion and a second portion, said first portion angularly disposed relative to said second portion;
   b. holding element movable toward said base member;
   c. locking means for fastening said holding element to said base member;
   d. securing means for supporting said base member to the rod; and
   e. disengagement means for interrupting linkage of the rod to the motor including a pair of blocks supporting the rod adjacent the source of heat, and a pair of stops fixed to the rod to prevent movement of the rod along said pair of blocks.

7. The mechanism of claim 6 in which said pair of stops are locked along the rod to permit one of said pair of stops to contact one of said pair of blocks while the other of said pair of stops is free form contact with the other of said pair of blocks.

8. The mechanism of claim 7 in which said pair of blocks are formed with an open notch permitting the rod to be lifted therefrom.

9. A rotisserie mechanism utilizing a rod rotatable over a source of heat comprising:
   a. a base member connected to the rod including a first portion and a second portion, said first portion angularly disposed relative to said second portion;
   b. holding element movable toward said base member;
   c. locking means for fastening said holding element to said base member, said locking means including a flange forming a clamp with said base member; and
   d. securing means for supporting said base member to the rod.

* * * * *